United States Patent
Vorhies et al.

(10) Patent No.: US 9,268,354 B1
(45) Date of Patent: Feb. 23, 2016

(54) LEVER ASSEMBLIES AND METHODS

(71) Applicant: EVolve Technologies, LLC, Sandpoint, ID (US)

(72) Inventors: Todd Vorhies, Sandpoint, ID (US); Nathaniel Egging, Hayden, ID (US)

(73) Assignee: EVolve Technologies, LLC, Sandpoint, ID (US)

( * ) Notice: Subject to any disclaimer, the term of this patent is extended or adjusted under 35 U.S.C. 154(b) by 111 days.

(21) Appl. No.: 13/866,510

(22) Filed: Apr. 19, 2013

Related U.S. Application Data

(60) Provisional application No. 61/635,630, filed on Apr. 19, 2012.

(51) Int. Cl.
*G05G 1/04* (2006.01)
*F16C 1/10* (2006.01)

(52) U.S. Cl.
CPC .......................................... *G05G 1/04* (2013.01)

(58) Field of Classification Search
CPC ... G05G 1/04; B62M 25/04; Y10T 74/20438; Y10T 74/20612
USPC ....... 74/473.13, 484 R, 486, 488, 489, 501.6, 74/502.2, 502.6, 503, 511 R, 519, 74/523–525, 551.1, 551.8; 188/24.11, 344
IPC ..................................... B60T 11/00; G05G 1/04
See application file for complete search history.

(56) References Cited

U.S. PATENT DOCUMENTS

| | | | | |
|---|---|---|---|---|
| 4,018,292 A * | 4/1977 | Roll et al. | | 173/170 |
| 4,771,649 A | 9/1988 | Modolo | | |
| 5,443,134 A * | 8/1995 | Gajek et al. | | 188/344 |
| 5,572,907 A | 11/1996 | Kaakinen | | |
| 5,868,377 A * | 2/1999 | Taomo et al. | | 251/294 |
| 5,871,202 A * | 2/1999 | Taomo et al. | | 251/294 |
| 6,041,895 A | 3/2000 | Mao | | |
| 6,484,855 B1 * | 11/2002 | Yaple | | 192/13 R |
| 6,502,675 B1 | 1/2003 | Andrus | | |
| 7,204,169 B2 * | 4/2007 | Mitchell | | 74/489 |
| 7,240,772 B2 | 7/2007 | Tsai | | |
| 7,249,661 B2 | 7/2007 | Becocci et al. | | |
| 7,487,694 B2 | 2/2009 | Fukui | | |
| 7,546,909 B2 | 6/2009 | Campbell et al. | | |
| 2009/0152063 A1 | 6/2009 | Tsai | | |
| 2011/0031079 A1 | 2/2011 | Matsushita | | |

* cited by examiner

*Primary Examiner* — Adam D Rogers
(74) *Attorney, Agent, or Firm* — Wells St. John P.S.

(57) ABSTRACT

Lever assemblies are provided that can include: an enclosure; a lever pivotably coupled to the enclosure; one member extending from one end to another end, the one end of the one member floating within the enclosure and the other end of the one member pivotably coupled to the lever; and another member extending from one end to another end, the one end of the other member pivotably coupled to the lever and the other end of the other member pivotably fixed to the enclosure. Methods for providing force from a lever associated with an enclosure are provided with the methods including: providing a lever pivotably coupled to an enclosure and extending along a length of the enclosure in one cross section; compressing the lever toward the enclosure to extend a member within the enclosure and provide force along the length of the enclosure with the member.

10 Claims, 11 Drawing Sheets

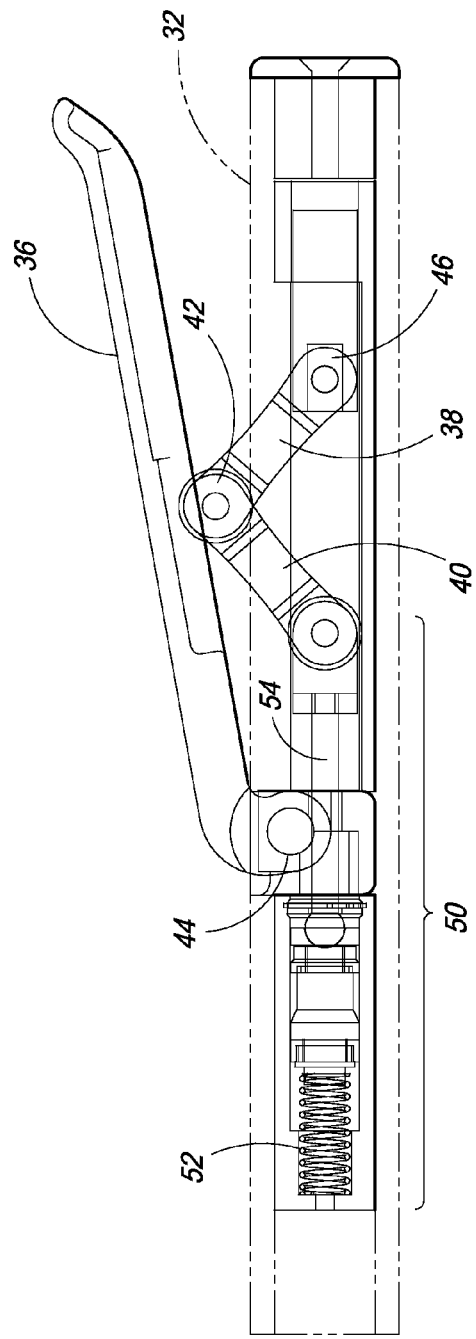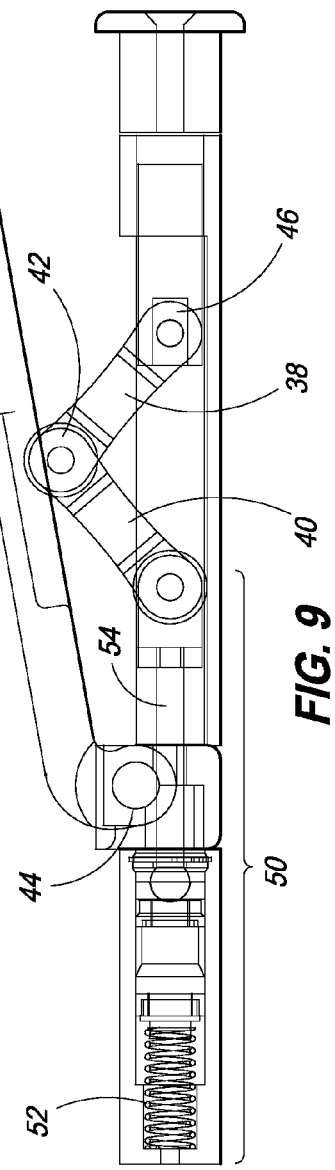

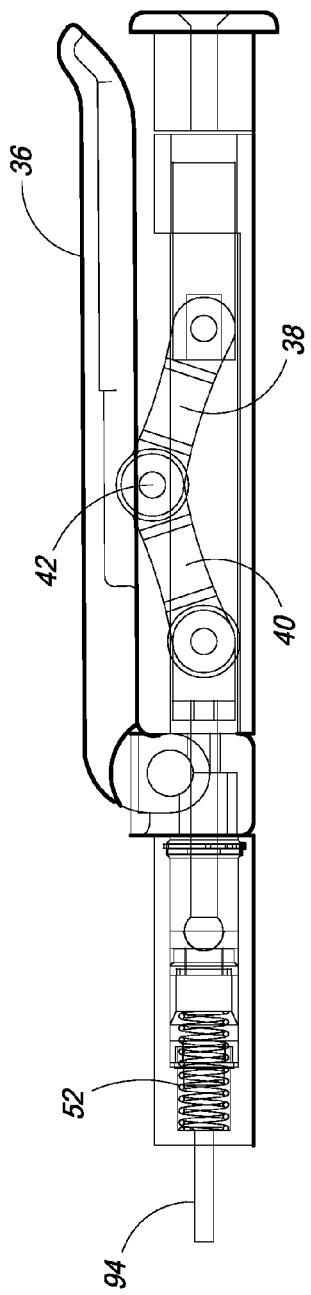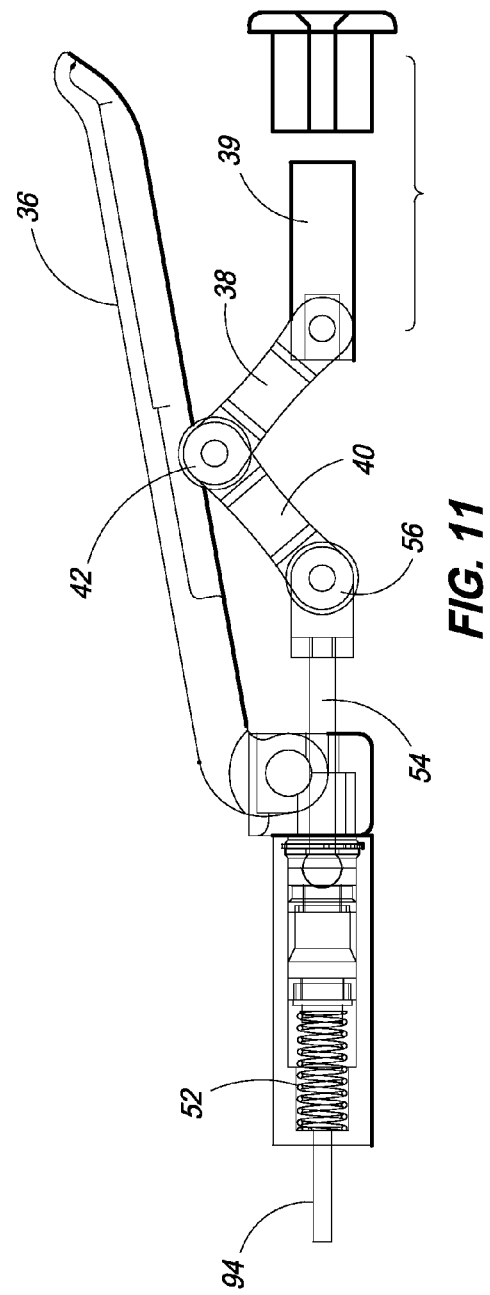

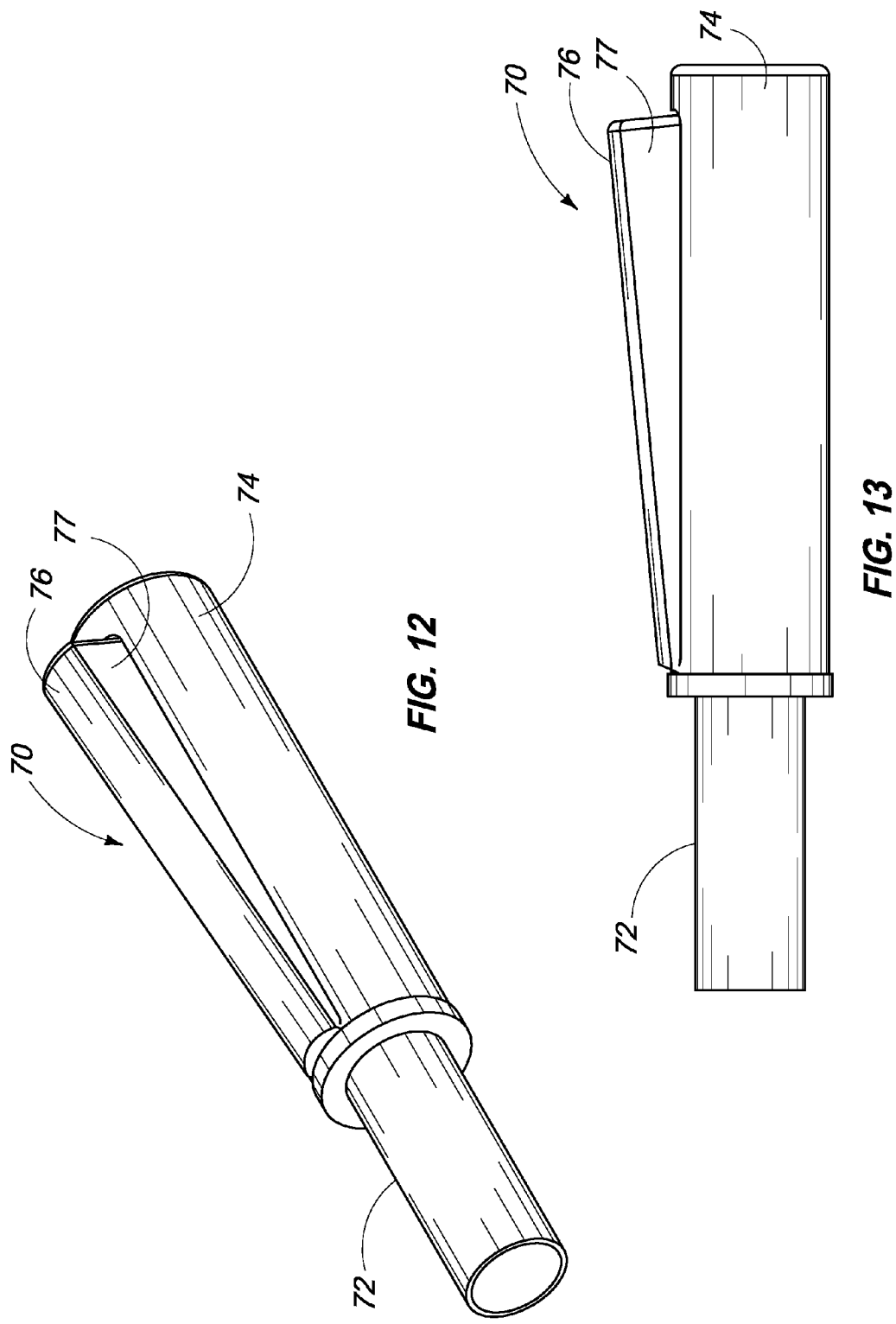

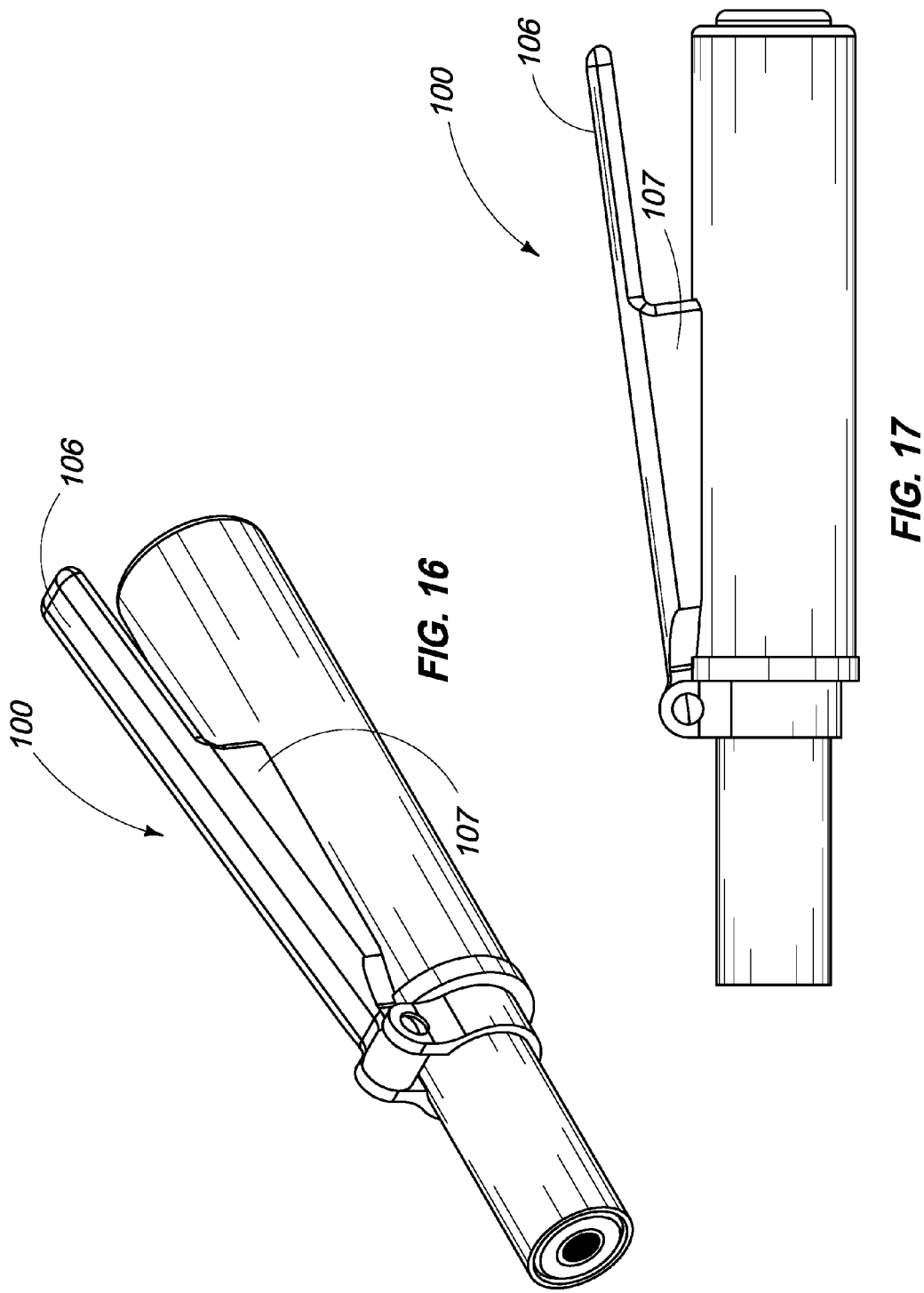

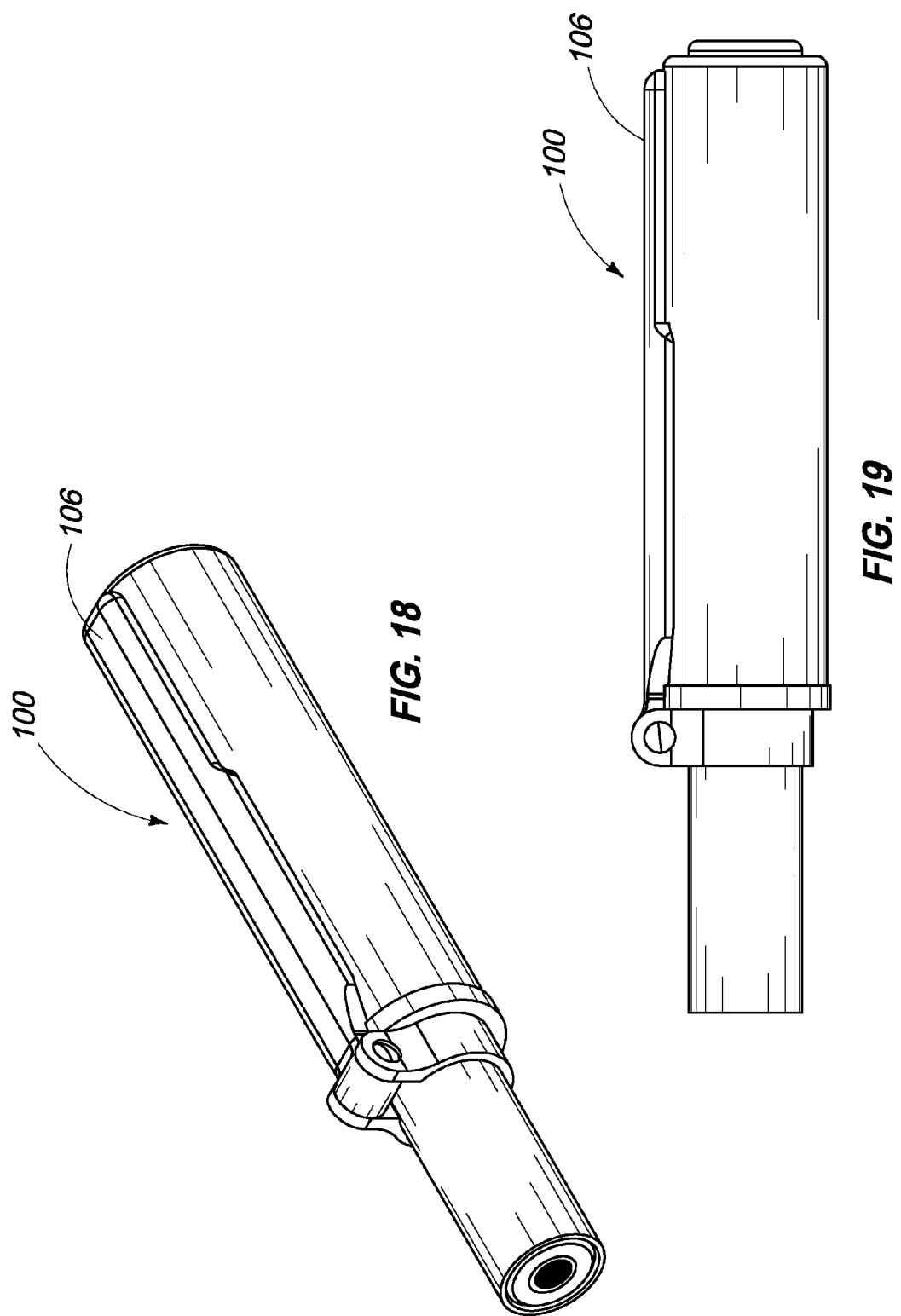

LEVER ASSEMBLIES AND METHODS

CROSS REFERENCE TO RELATED APPLICATION

This application claims priority to U.S. Provisional Patent Application Ser. No. 61/635,630 which was filed on Apr. 19, 2012, the entirety of which is incorporated by reference herein.

TECHNICAL FIELD

The present disclosure relates to actuation systems in general and more particularly internal lever assemblies and methods.

BACKGROUND

Many designs are available for dictating the control of mechanical devices between one location and another location. These systems can include cabling systems and/or hydraulic systems, but typically, the systems have cables and or hydraulics that exist outside and act as an encumbrance when utilizing the device associated with the systems. For example, bicycle braking systems typically have a lever associated with the handlebar of the bicycle and a cable that extends from the lever outside the handlebar and down to the braking assembly that is associated with one or more of the wheels of the bicycle. These cables can cause problems for the rider during use and/or storage of the bicycle. The present disclosure provides internal lever assemblies and methods.

SUMMARY OF THE DISCLOSURE

Lever assemblies are provided that can include: an enclosure; a lever pivotably coupled to the enclosure; one member extending from one end to another end, the one end of the one member floating within the enclosure and the other end of the one member pivotably coupled to the lever; and another member extending from one end to another end, the one end of the other member pivotably coupled to the lever and the other end of the other member pivotably fixed to the enclosure.

Methods for providing force from a lever associated with an enclosure are provided with the methods including: providing a lever pivotably coupled to an enclosure and extending along a length of the enclosure in one cross section; compressing the lever toward the enclosure to extend a member within the enclosure and provide force along the length of the enclosure with the member.

BRIEF DESCRIPTION OF THE DRAWINGS

Embodiments of the disclosure are described below with reference to the following accompanying drawings.

FIG. 8 is a cross-sectional view of the grip of FIG. 7 according to an embodiment.

FIG. 9 is another view of the grip of FIG. 7 according to an embodiment.

FIG. 10 is a view of the grip of FIGS. 7-9 in one position according to an embodiment.

FIG. 11 is a view of the grip of FIGS. 7-10 in another position according to an embodiment.

FIGS. 12 and 13 are views of a lever assembly according to an embodiment of the disclosure.

FIGS. 16-19 are views of a lever assembly according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1A:
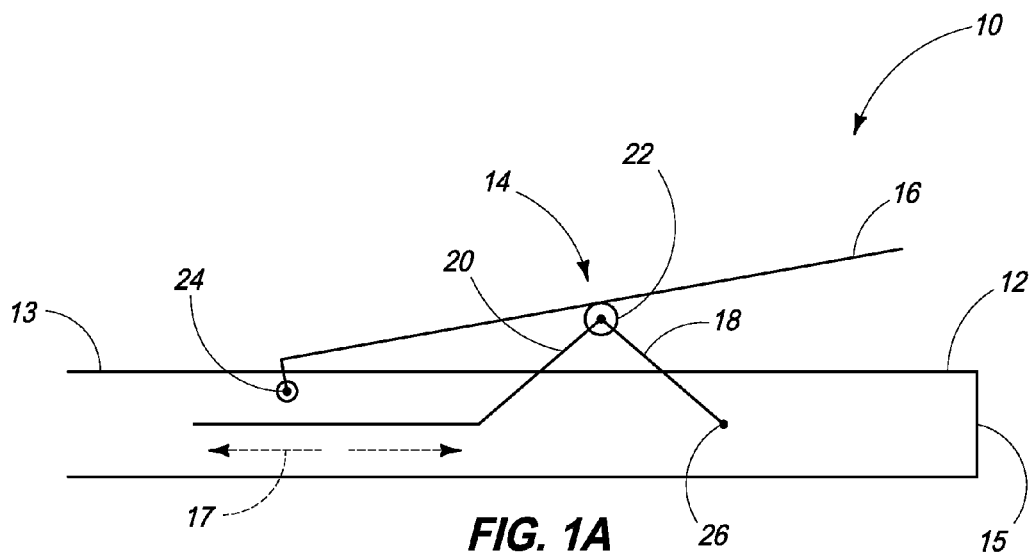
FIGS. 1A-1B depict a lever assembly in at least two configurations.

The lever assemblies and methods will be described with reference to FIGS. 1-19. Referring first to FIG. 1A, an assembly 10 is shown that includes an enclosure 12 pivotably associated with a lever assembly 14. The lever assembly 14 can include a main member 16 that extends pivotably from enclosure 12 via a pivotal coupling 24. Pivotably coupled can include but is not limited to a shaft engaging one or more openings or recesses that engage the shaft and allow for the shaft to rotate about its lengthwise axis within the one or more openings. Levers and/or members, for example, can be coupled to the shaft allowing for the levers and members to be pivotably associated with a construct that forms the one or more openings and/or is associated therewith.

Enclosure 12 can extend from one end 13 to another end 15 along an axis 17 in at least one cross section. Lever 16 can extend lengthwise from a one end to another end along axis 17 in the at least one cross section. Lever 16 can be pivotably coupled to enclosure 12 at a point 24 distal from the other end 15 of enclosure 12, for example.

Assembly 10 can include one or more members 18 and 20 for example. Assembly 10 can include at least two members pivotably associated with member 16, a member 18 and a member 20. For example, member 18 can be associated with the other end 15 of enclosure 12, while member 20 is more closely associated in physical location with the central portion of enclosure 12, or the one end 13 of enclosure 12. Members 18 and 20 are pivotably associated with member 16 via a pivotal coupling 22.

Coupling 22 can be configured to float or ride against lever 16 during actuation. For example, as force is applied to lever 16, coupling 22 may move along the axis of lever 16. One of the members can extend from one end to another end with the one end of the one member floating within enclosure 12 and the other end of the one member pivotably coupled to lever 16 via coupling 22, as depicted as member 20 in FIG. 1A for example. Another member can extend from one end to another end with the one end of the other member pivotably coupled to lever 16 via coupling 22 and the other end of the other member pivotably fixed to enclosure 12 as shown FIG. 1A at 26. For example, the other end of the other member can be pivotably fixed proximate to the other end 15 of enclosure 12. Accordingly, the other end of the other member can be pivotably fixed distal to the other end of enclosure 12. In accordance with alternative configurations, an end of member 18 can be configured to float while an end of member 20 can be pivotably fixed.

One or both of these members can reside along axis 17 for example. In accordance with example configurations, one or both of the members can reside between the other end 15 and the end 13 and/or coupling 24. As an example, the one end of the one member can oppose the other end of the other member.

Figure 1B:
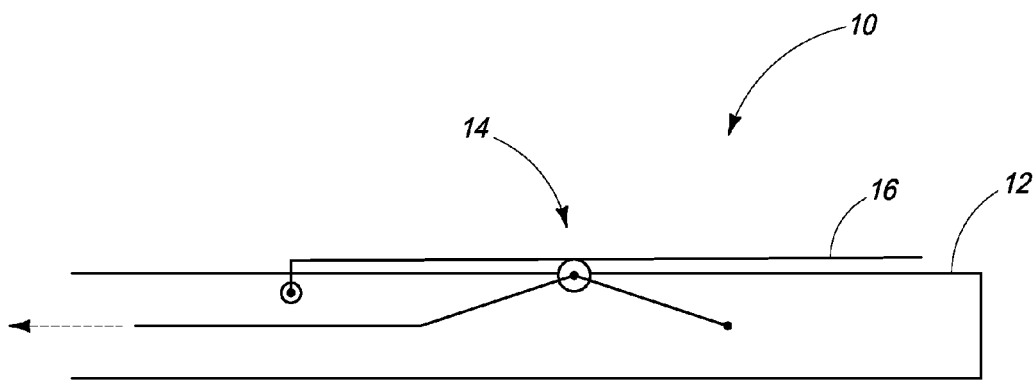

In accordance with example configurations, while end 26 of member 18 is pivotably affixed, an end of member 20 within enclosure 12 may be free to move in one or more directions associated with the force applied to lever 16; along axis 17 is just one of the one or more directions. In accordance with other example configurations, an end of member 20 can be pivotally affixed within enclosure 12, and end 26 may be free to move within enclosure 12 consistent with the force applied to lever 16 via a rolling or traveling pivotal coupling. As FIG. 1A shows, mechanism 14 is shown in one position, with the lever 16 biased in the upward or unengaged position. Referring to FIG. 1B, assembly 14 is shown in another position wherein lever 16 is in the engaged or compressed position.

Figure 2:
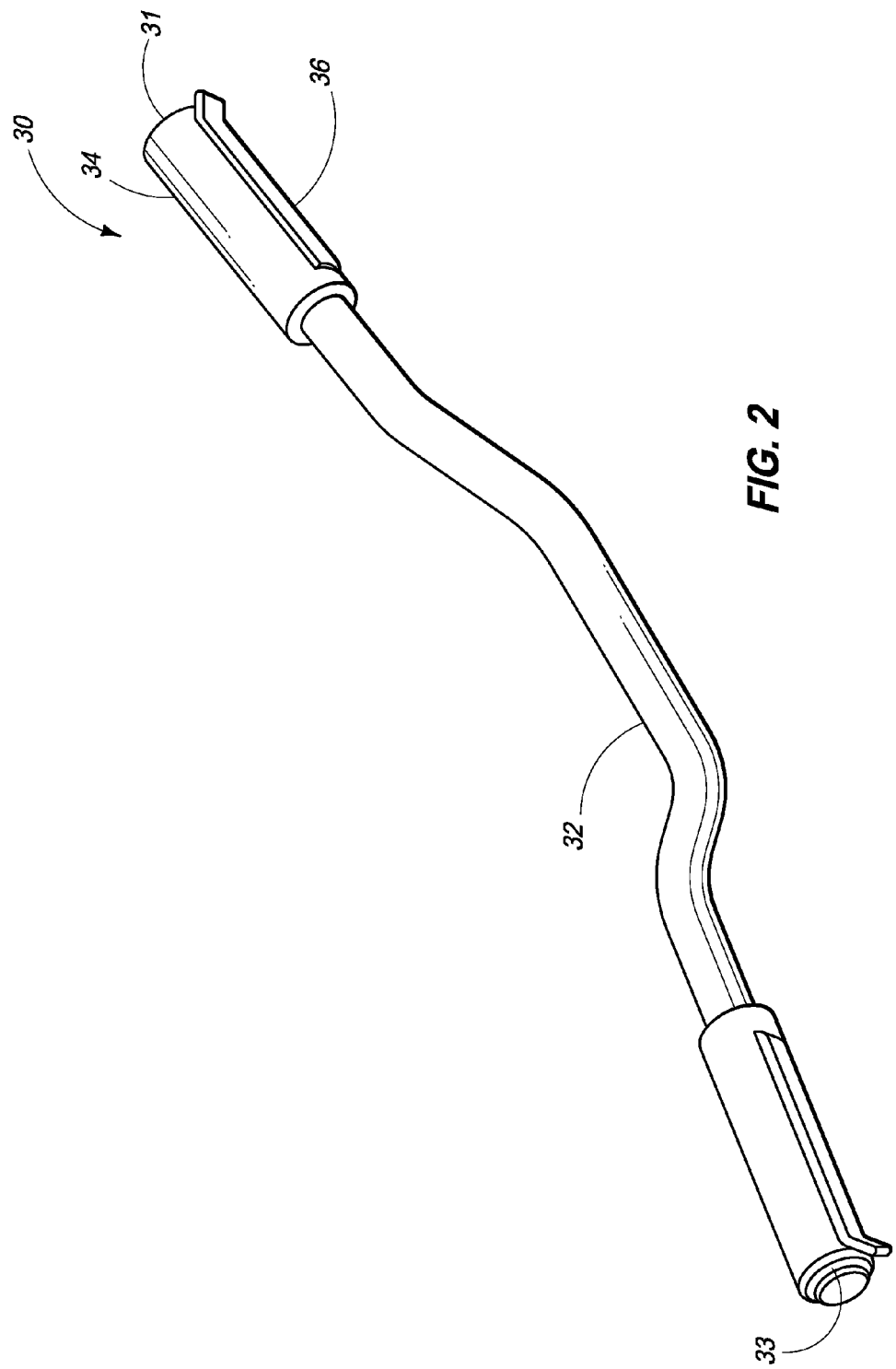
FIG. 2 is a depiction of an enclosure such as a handlebar according to an embodiment.
Figure 3:
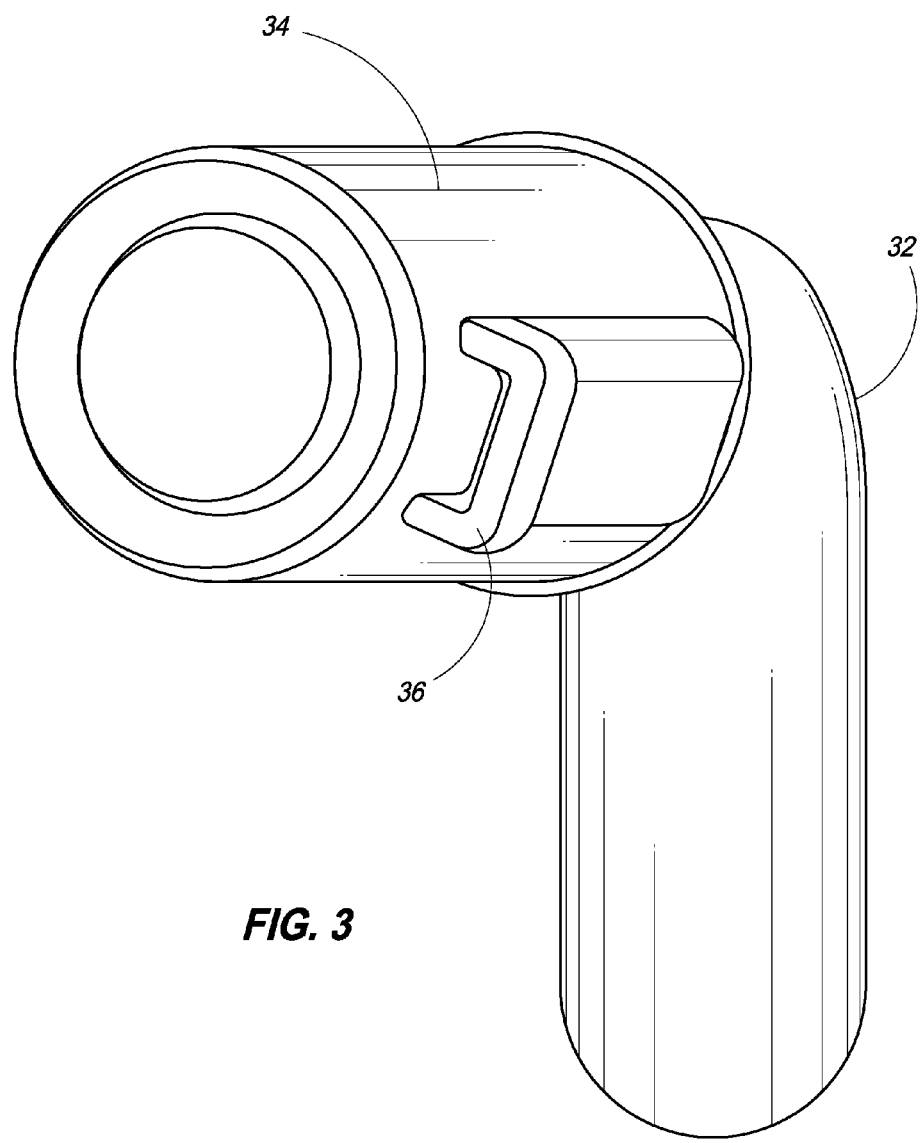
FIG. 3 is another view of an enclosure such as a handlebar according to an embodiment.
Figure 4:
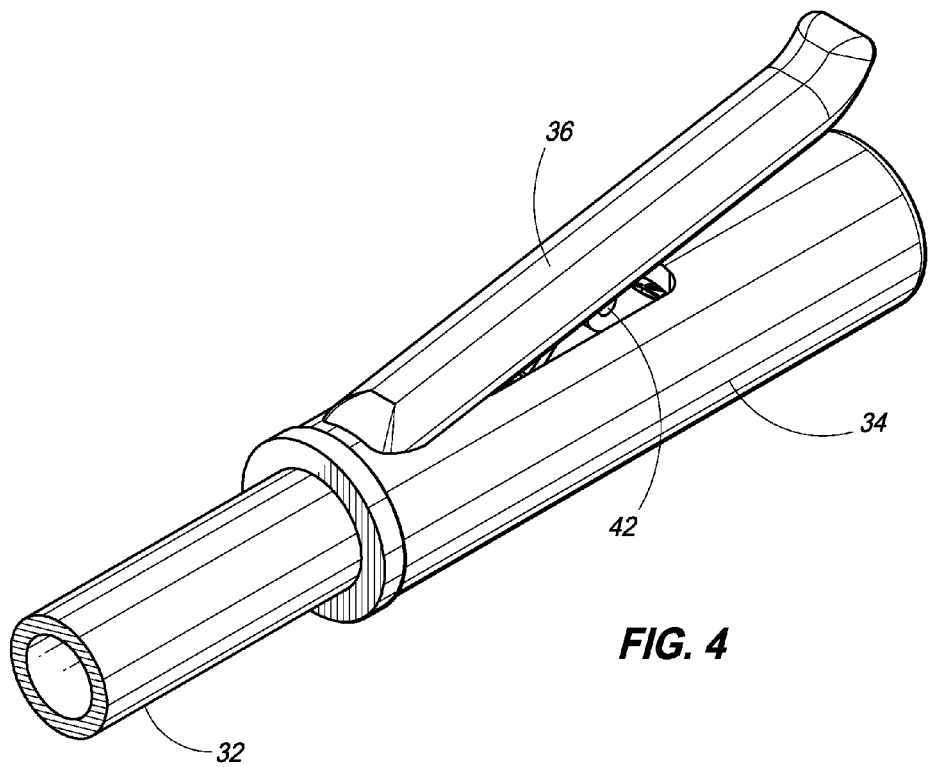
FIG. 4 is a view of a handlebar grip according to an embodiment.
Figure 5:
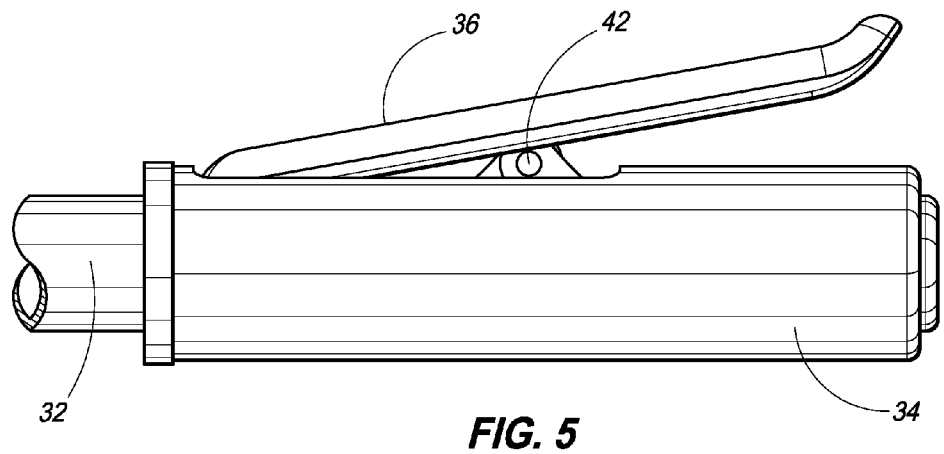
FIG. 5 is another view of the grip of FIG. 4 according to an embodiment.
Figure 6:
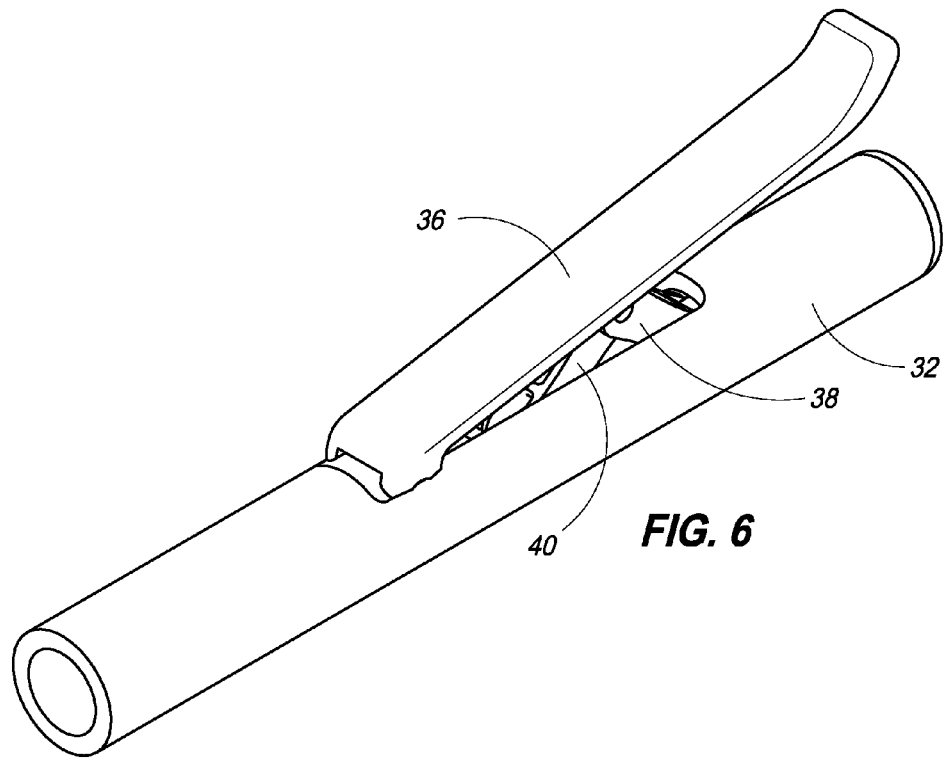
FIG. 6 is another view of the handlebar of FIGS. 4 and 5 according to an embodiment.

Referring next to FIG. 2, assembly 30 is shown that is configured as a vehicle lever assembly, for example, a handlebar, such as a tubular handlebar. Assembly 30 can include a main bar or enclosure 32 extending between one end 31 and another end 33. Grip portion 34 having a lever 36 associated with the grip portion can be associated with either or both of ends 31 and/or 33. Referring to FIG. 3, another view of the terminus of the handlebar is shown. Referring to FIGS. 4-6, alternative views of the terminus or grip portion of the handlebar are shown that include lever 36 coupling 42 and/or members 38 and 40.

Figure 7:
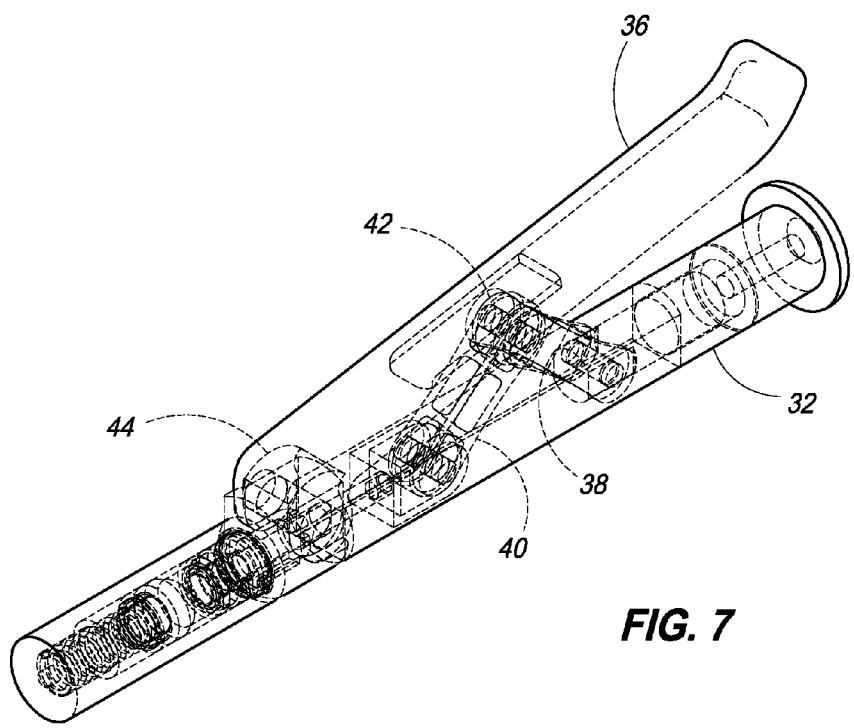
FIG. 7 is a view of a lever assembly according to an embodiment.
Figure 14:
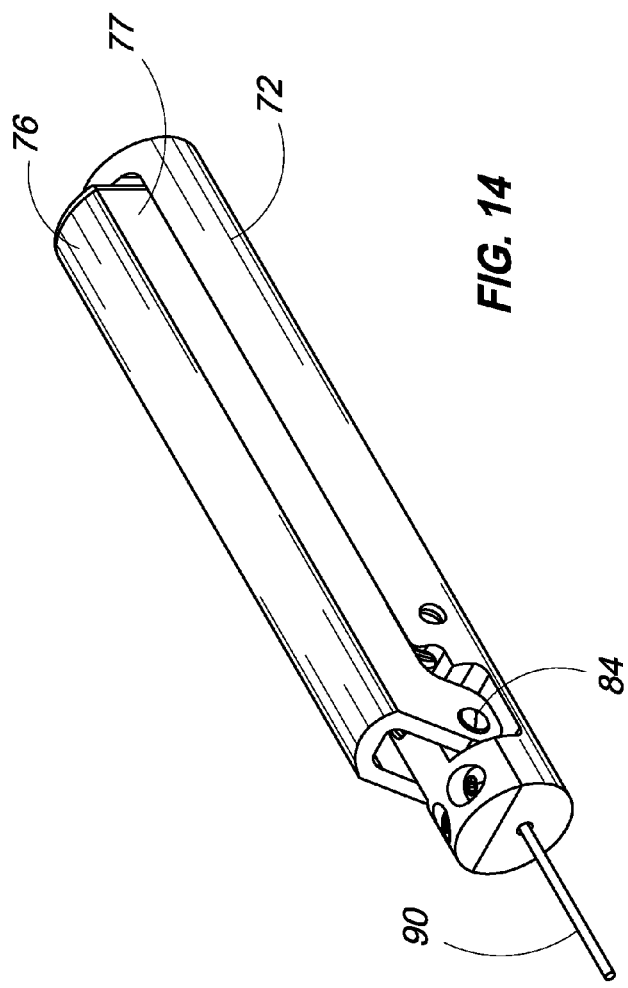
FIGS. 14 and 15 are cross sectional views of the lever assembly of FIGS. 12 and 13 according to an embodiment of the disclosure.

Referring to FIG. 7, another view of the terminus of the grip portion is shown to include lever 36 having distal and proximate members 38 and 40 pivotally associated via pivotal coupling 42 therewith. Lever 36 can be pivotally associated with enclosure 32, for example, via pivotal coupling 44.

Referring to FIG. 8 and FIG. 9, side cutaway views of the grip portion of the handlebar are shown. In accordance with these views, member 38 is pivotally affixed within enclosure 32 via a fixed pivotal coupling 46, and member 40 is pivotally associated with a biasing and control assembly 50.

Biasing and control assembly 50 can include a biasing member 52 such as a spring. It can also be configured to be an actuator to provide hydraulic force within tubing associated with assembly 50. This tubing can be associated with a hydraulic braking system for use on a bicycle, for example.

Referring to FIG. 9, member 40 can be pivotally coupled to assembly 50 via member 54 that extends into assembly 50. Referring to FIG. 10 and FIG. 11, at least the grip portion of the handlebar is shown in two configurations. In FIG. 10, the grip portion is shown in a compressed configuration, wherein member 38 and 40 are compressed within enclosure 32, thereby actuating assembly 50 to provide, for example, hydraulic pressure to a hydraulic braking system comprising a hydraulic line 94, thereby engaging the braking system. In FIG. 11, the assembly is shown in an uncompressed form wherein the lever 36 such as a braking lever is biased in the upward position, showing member 40 pivotally attached to member 54 via coupling assembly 56. Stop 39 fixes member 38 within enclosure 32

Figure 15:
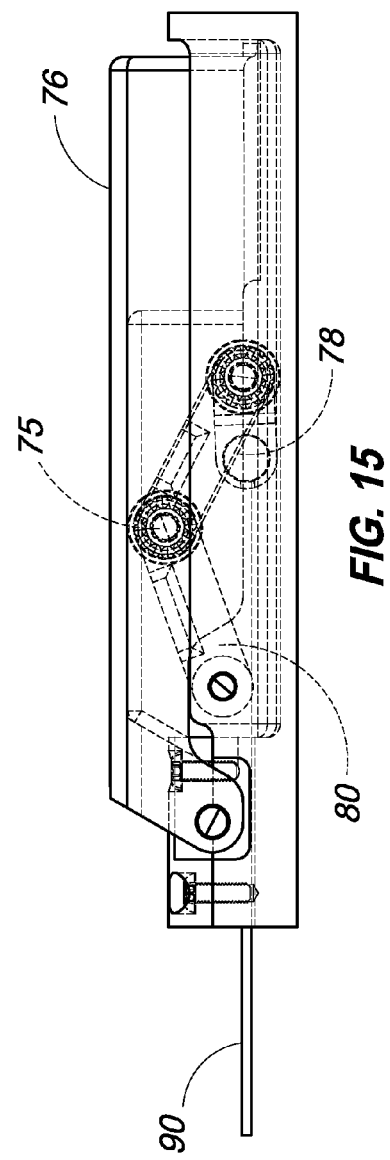

Referring to FIGS. 12-15, lever assemblies 70 are provided that can include an enclosure 72 having a grip assembly 74 and a lever 76 pivotably associated with enclosure 72. In accordance with example implementations, lever 76 can include a shroud 77 that may extend the length of lever 76. In accordance with example implementations, lever 76 can be pivotably coupled at 84 to enclosure 72. With particular reference to FIG. 15, member 80 can have one end pivotably fixed within enclosure 72 and another end pivotably coupled at 75 to lever 76. Member 78 can have one end be pivotably coupled at 75 and another end floating within enclosure 72. In accordance with example implementations, assembly 70 can be configured to operatively engage a cable 90 providing force against the cable in a direction along the axis of enclosure 72 toward an end of enclosure 72. Referring to FIGS. 16-19, according to another embodiment, assembly 100 can include a lever 106 having a shroud 107. In accordance with example implementations, the assemblies can include openings configured to receive the shrouds.

In accordance with the assemblies of the present disclosure, methods for providing force from a lever associated with an enclosure are provided. The methods can include providing a lever pivotably coupled to an enclosure and extending along a length of the enclosure in one cross section. The methods further provide for compressing the lever toward the enclosure to extend a member within the enclosure and provide force along the length of the enclosure with the member. In accordance with example configurations, the force can be provided along the length of the enclosure away from a terminus of the enclosure. In accordance with another example configuration, the force can be provided along the length of the enclosure toward a terminus of the enclosure.

In the hydraulic line configuration and/or the cable configuration, the lines and/or cables can be operatively coupled to another assembly to actuate same. The members and/or couplings of the present disclosure can be manufactured from metal and/or plastic, such as aluminum and/or polybutadiene, for example.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A lever assembly comprising:
    a tubular enclosure, the tubular enclosure extends from one end to another end along an axis in at least one cross section;
    a lever comprising a body with two ends and one of the ends is pivotally coupled within the enclosure at a first point within the enclosure, the lever extending lengthwise along the axis in the at least one cross section;
    a first member extending from one end to another end, the one end of the first member slidable within the enclosure about a second point and along the axis within the enclosure, and the other end of the first member slidably engaging the body of the lever; and
    a second member extending from one end to another end, the one end of the second member pivotably coupled to the other end of the first member, and the other end of the second member pivotably fixed within the enclosure at a third point within the enclosure, the first, second, and third points being spaced apart from one another along the axis within the tubular enclosure.

2. The lever assembly of claim 1 wherein the lever further defines a groove extending along the body of the lever.

3. The lever assembly of claim 2 wherein the pivotal coupling of the one end of the second member to the other end of the first member is engaged within the groove extending along the body of the lever.

4. A vehicle lever assembly comprising:
a tubular handlebar extending between one end and another end;
a pair of handlebar grip assemblies, one at each end of the tubular handlebar and extending from one end to another end along an axis in at least one cross section, each grip assembly comprising:
a lever comprising a body with two ends and one of the ends is pivotally coupled within the tubular handlebar at a first point within the handlebar, the lever extending lengthwise along the axis in the at least one cross section;
a first member extending from one end to another end, the one end of the first member slidable within the handlebar about a second point and along the axis within the handlebar, and the other end of the first member slidably engaging the body of the lever; and
a second member extending from one end to another end, the one end of the second member pivotably coupled to the other end of the first member, and the other end of the second member pivotably fixed within the handlebar at a third point within the handlebar, the first, second, and third points being spaced apart from one another along the axis within the tubular handlebar.

5. The vehicle lever assembly of claim 4 wherein the second point is between the first and third points along the axis.

6. The vehicle lever assembly of claim 4 wherein the second point is between one of the ends of the handlebar and the first point.

7. The vehicle lever assembly of claim 4 wherein the lever further comprises a shroud.

8. The vehicle lever assembly of claim 7 wherein each of the grips further defines an opening configured to receive at least a portion of the shroud.

9. The vehicle lever assembly of claim 4 further comprising a hydraulic line coupled to the one end of the first member.

10. The vehicle lever assembly of claim 4 further comprising a cable coupled to the one end of the first member.

* * * * *